United States Patent
Lindeborg et al.

(10) Patent No.: US 6,556,579 B1
(45) Date of Patent: Apr. 29, 2003

(54) METHOD AND APPARATUS FOR DETECTING DUPLICATE BUFFERS IN A DESCRIPTOR BASED MULTI-PORT QUEUE

(75) Inventors: Carl John Lindeborg, Shrewsbury, MA (US); James Scott Hiscock, Rockport, MA (US); Normand Louis Magnan, Woonsocket, RI (US); John Ernest Ziegler, Westborough, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/400,330

(22) Filed: Sep. 21, 1999

(51) Int. Cl.[7] .............................................. H04L 12/28
(52) U.S. Cl. ...................................... 370/412; 370/428
(58) Field of Search ................................ 370/412, 413, 370/428, 429, 395.42, 414, 415, 416, 417, 418; 710/52, 53, 54, 55, 57

(56) References Cited

U.S. PATENT DOCUMENTS

| | | | | |
|---|---|---|---|---|
| 5,563,829 A | * | 10/1996 | Huang | |
| 5,610,914 A | * | 3/1997 | Yamada | |
| 5,710,770 A | * | 1/1998 | Kozaki et al. | |
| 5,802,055 A | * | 9/1998 | Krein et al. | |
| 5,864,553 A | * | 1/1999 | Aramaki | |
| 5,978,886 A | * | 11/1999 | Moncton | |
| 6,061,351 A | * | 5/2000 | Erimli et al. | |
| 6,301,259 B1 | * | 10/2001 | Nakabayashi | |

* cited by examiner

Primary Examiner—Ajit Patel
Assistant Examiner—Steven A Blount
(74) Attorney, Agent, or Firm—McGlew and Tuttle, P.C.

(57) ABSTRACT

A main data memory is provided in a network device and includes a plurality of buffers for storing data packets. A plurality of descriptors, or pointers, point to the individual buffers. A status of the descriptors is stored in a descriptor reference memory. The status information includes whether the descriptors are in an active or free state, and an indication of copies of the descriptors in the transmit queues. A descriptor free pool includes a list of the descriptors in the free state.

14 Claims, 3 Drawing Sheets

METHOD AND APPARATUS FOR DETECTING DUPLICATE BUFFERS IN A DESCRIPTOR BASED MULTI-PORT QUEUE

FIELD OF THE INVENTION

The present invention relates to a descriptor based memory queuing system for transmitting data packets to a one or more transmit ports in a device of a computer network, and in particular to a system where duplicate buffers can be detected.

BACKGROUND OF THE INVENTION

Many computer network devices, such as bridges, routers, switches and/or hubs, receive data packets and must then forward these packets to one or more transmit ports. The determination of which transmit ports a particular packet is to be sent to, is performed by the higher logic of the network device and is already well known to those skilled in the art. The speed at which each transmit port can send out data packets depends on the speed of the connection, the speed of the receiving port and other factors that can change for each port. Also a data packet can be sent to more than one port at a time, in a process known as multicasting, broadcasting and flooding.

Therefore it is important that the status of the individual transmit ports be closely coordinated with the presence of data packets which are to be sent out on those ports. This can be done using transmit queues for each transmit port and copying a pointer or descriptor into the proper transmit queue which points to the address of a buffer in a main-data memory which stores the data packet.

A problem in this descriptor queuing scheme is duplication of buffer descriptors. Generally, these problems result from logic errors in the buffer descriptor management. Duplication of buffers is potentially a serious problem as bad packets may be sent. Bad packets may take the form of non-sense packets and/or well formed packets transmitted on an unintended port. The later having great consequence to network configuration and security.

SUMMARY AND OBJECTS OF THE INVENTION

It is a primary object of the present invention to provide early detection of duplicate buffers and the timely shutdown of the offending transmit queues. This makes for buffer management in the present invention to be exceptionally robust.

In order to accomplish early detection, the Queuing Control logic must track the state of the descriptor and corresponding value in the Descriptor Reference Memory. The Queuing Control logic will flag illegal operations and optionally reinitialize the offending queue(s).

In particular, a main data memory is provided in the network device and includes a plurality of buffers for storing data packets. A plurality of descriptors, or pointers, point to the individual buffers. A status of the descriptors is stored in a descriptor reference memory. The status information includes whether the descriptors are in an active or free state, and an indication of copies of the descriptors in the transmit queues. A descriptor free pool includes a list of the descriptors in the free state.

When the system receives a data packet, it takes a one of the descriptors from the descriptor free pool and checks the status information in the descriptor reference memory for that descriptor. If the checking reveals the status information is the active state, a duplicate buffer error is indicated. If the status information indicates the free state, the system stores the data packet in the buffer of the main memory as pointed to by that descriptor.

The system, and more particularly the queue control logic, places a copy of the descriptor in one or more of the plurality of transmit queues of which the queue control logic has previously determined the data packet should be sent out on. The queue control logic then changes the status information in the descriptor reference memory from the free state to the active state and records an indication of the copies of the one descriptor placed in the plurality of transmit queues.

The indication of the copies can be a counting of the number of copies in each transmit queue or port, or having a separate marker for each "copy" placed in a transmit queue. A further possibility is a separate marker for each "transmit queue" with different states of the marker indicating whether that transmit queue includes a copy of the respective descriptor.

The queue control logic transmits the data packets from the main data memory and out the transmit ports according to the copies of the descriptors in the respective transmit queues. The queue control logic then removes the corresponding copies of the descriptors from the respective transmit queues, and decrements the indication of copies of the one descriptor each time, the copy of the one descriptor is removed from the plurality of transmit queues.

Before the decrementing, the status information in the descriptor reference memory for to be decremented descriptor is checked. The system indicates a duplicate buffer error if the checking before the decrementing reveals the status information is the free state.

When the indication of copies is empty or null, the queue control logic returns the one descriptor to the descriptor free pool and changes the status information from the active state to the free state.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
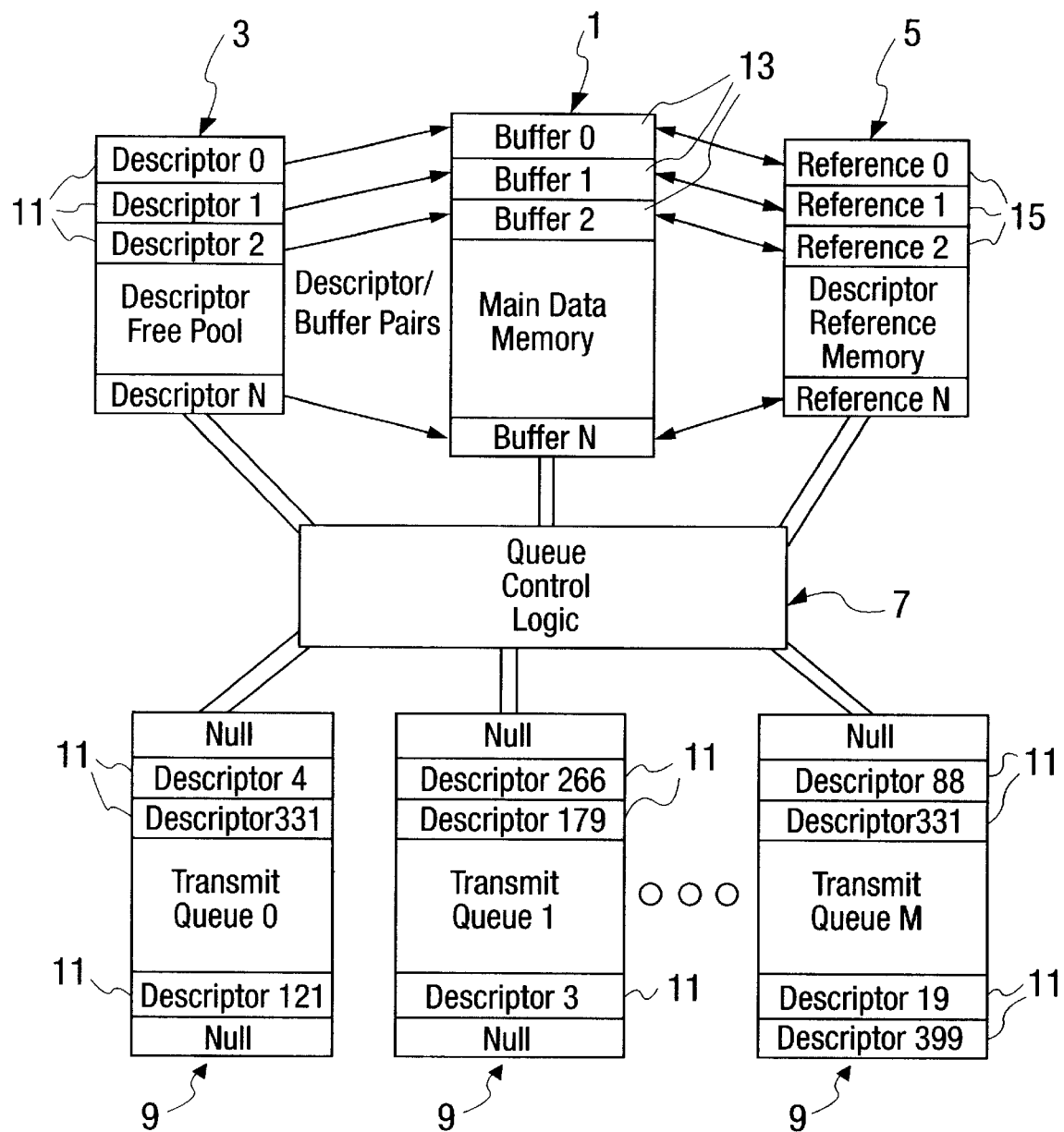
FIG. 1 is a schematic diagram of the individual components of the network device according to the present invention.

Referring to the drawings, and in particular to FIG. 1, the Memory/Queuing system consists of 5 major components; Main Data Memory 1, Descriptor Free Pool 3, Descriptor Reference Memory 5, Transmit Queues 9, and the Queuing Control Logic 7.

In this system, buffer descriptors 11 are used to allocate memory blocks or buffers 13 to individual packets of packet streams. Each buffer descriptor 11 is a pointer to the starting address of a fix length block or buffer 13 of memory. Thus, the number of descriptors 11 is proportional to the capacity of the Main Data Memory 1. In the simplest application, one descriptor 11 points to a buffer 13 (block of memory), that is large enough to hold a maximum length data packet.

More complex applications will use descriptors 11 which point to buffers 13 which are smaller than the maximum packet size. In this case, several descriptors 11 (Descriptor Set) may be used to accommodate large packets. When descriptor sets are used, the set is treated as a unit for the duration of the packet transfer.

Packet data is written to the Main Data Memory 1 when it is received. Packet Data is read by each transmit queue 9 each time a copy is sent.

The Descriptor Free Pool 3 is a FIFO memory which contains a list of all unused buffer descriptors 11. The Descriptor Control logic 7 will obtain a descriptor 11 (descriptor set) from the Descriptor Free Pool 3 when a packet is being received/written to the main Data Memory 1. The Descriptor Control Logic 7 will return a descriptor 11 (descriptor set) to the Descriptor Free Pool 3 when all copies of the packet have been sent.

The Transmit Queues 9 are associated with a specific destination port. Each Queue 9 is a FIFO memory which contains a list of buffer descriptors 11 (descriptor sets). In the simplest application, there is a single transmit queue 9 for each port. Multiple queues may exist for a port, typically to implement class or quality of service.

The Descriptor Reference Memory 5 is used to track the number of copies of each descriptor 11 that has been placed on transmit queues 9. The Descriptor Reference Memory 5 has one unique reference location 15 for each buffer 13 and descriptor 11. This reference location 15 is indexed by the buffer descriptor value.

Figure 2:
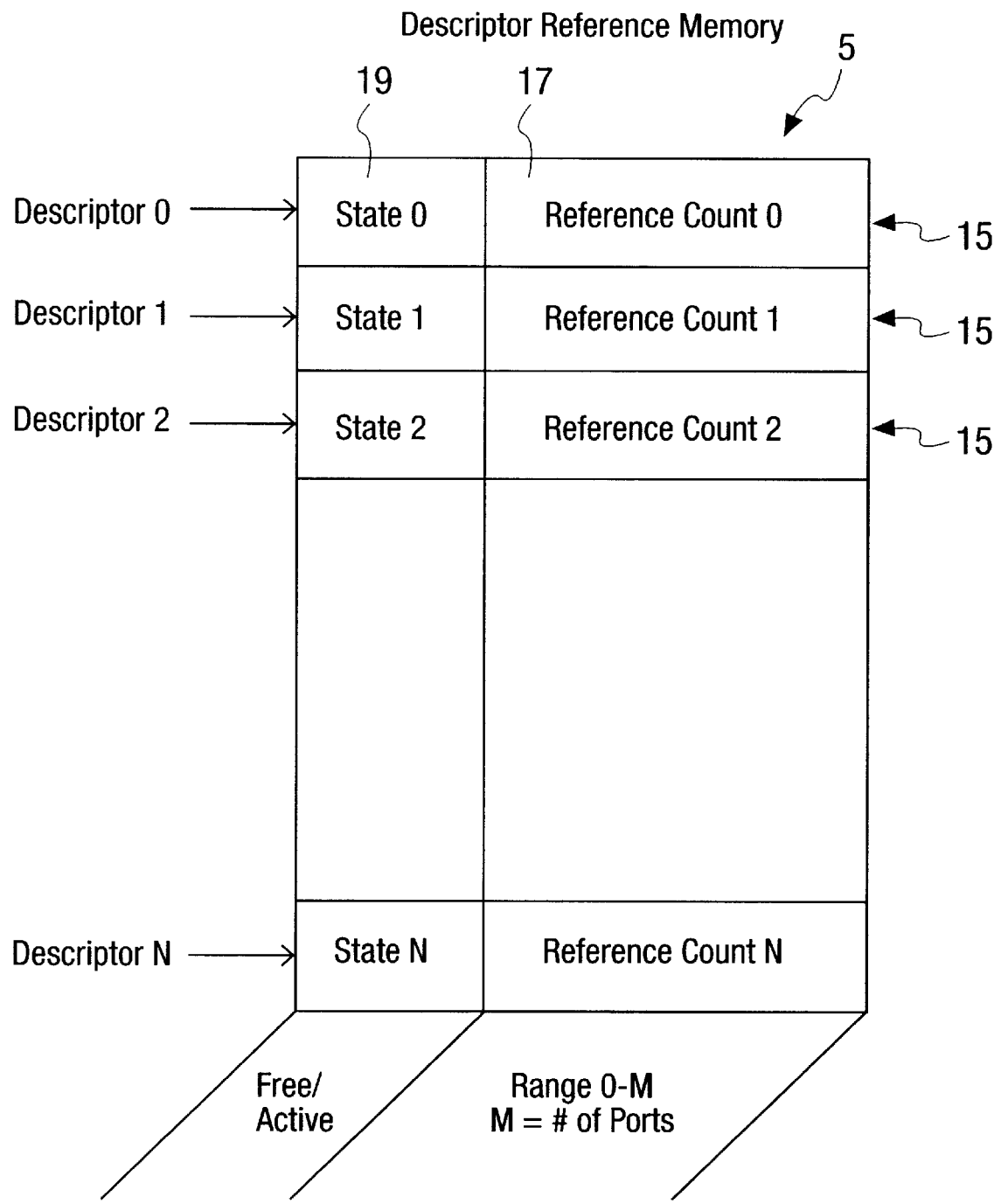
FIG. 2 is a diagram showing the internal structure of the descriptor reference memory according to a first embodiment.

In one implementation, as shown in FIG. 2, each descriptor specific reference memory location 15 contains a copy count 17 and descriptor state or status information 19. The copy count 17 is the number of copies of the buffer descriptor 11 that exist on all transmit queues 9. State information 19 indicates whether the respective descriptor 11 is active.

Upon initialization of the Memory/Queue system the state of all descriptors 11, as indicated in the Descriptor Reference Memory 5, is set to "Free". Each time the Queue Control logic 7 wishes to add a descriptor 11 to transmit queues 9 (EnQueue), it must check that the descriptor state 19 is "Free". If a descriptor 11 is not "Free" a Duplicate Buffer Error flag is set. If the descriptor state 19 was "Free" it is changed to "Active". The Descriptor Reference memory location 15 is written with a count 17 (Reference count) that is the number of queues 9 which have accepted the descriptor 11. FIG. 2 shows the Descriptor Reference memory structures require to implement this embodiment of Reference Count/State Duplicate Buffer Detection.

Each time the Queue Control logic 7 detects that a packet has been sent from a particular queue 9, the descriptor 11 (descriptor set) is removed from that transmit queue 9. The Queue Control logic 7 checks that each descriptor 11 has its status information/state 19 "Active". If a descriptor status information/state 19 is not "Active", the Duplicate Buffer Error flag is set. If the descriptor status information/state 19 was "Active" the Queue Control logic 7 decrements the descriptor specific Reference Count 17 in the respective reference location 15. If when updating the Reference Count 17, the Queue Control logic 7 determines that all copies of the descriptor 11 have been removed from all transmit, queues 9, the descriptor 11 is returned to the Descriptor Free Pool 3.

The Reference Count method stores a count 17 in each Reference Memory location 15. This is very efficient in terms of memory and compare logic width. There are drawbacks in terms of port/error isolation. All transmit queues must be shutdown and reinitialized when the error flag is set. Further, error detection in processing multicast and flooded uni-cast packet may be delayed. Error detection may only occur when the Descriptor State 19 should transition between "Active" and "Free". Because, copy count 17 is used to determine when to change the descriptor state 19 ("Active" to "Free"), errors that occur when indicating that a copy of the packet has been sent, may be delayed by the transfer time of several packets. In the worse case scenario, the packet is destined for all ports and the error occurs during the first copy transfer.

Figure 3:
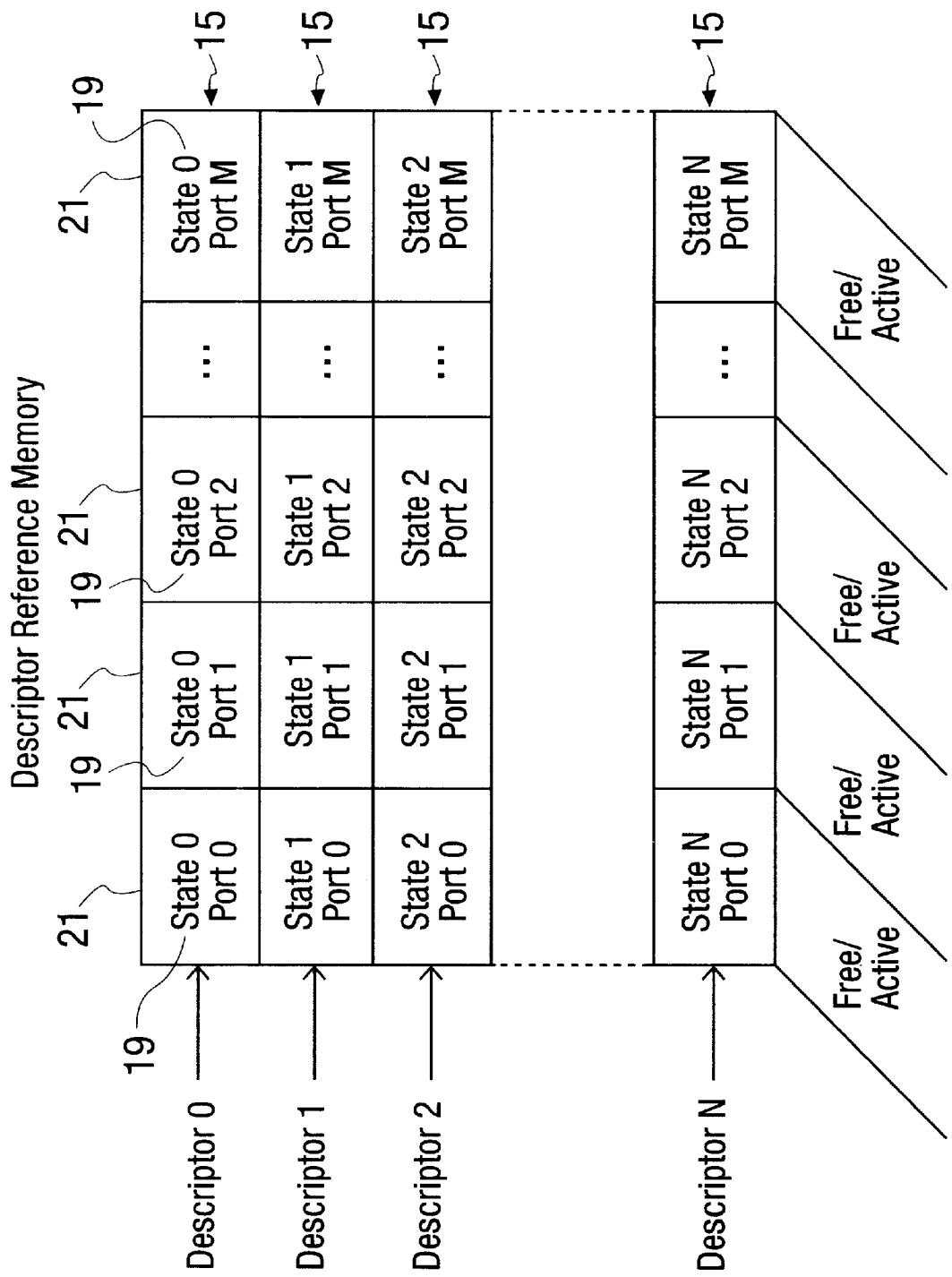
FIG. 3 is a diagram showing the internal structure of the descriptor reference memory according to a second embodiment.

In a Per Port/Queue State Method, as shown in FIG. 3, each (descriptor specific) reference memory location 15 will hold a marker 21 with state information 19 for each port (transmit queue 9). Port state "Active" indicates that the corresponding (port) transmit queue 9 has a copy of the descriptor 11.

The Per Port/Queue State Method stores the state 19 of each port/transmit queue 9 in separate markers 21 for each reference location 15 in the Descriptor Reference Memory 5. Upon initialization, all port/queue state information 19 is set to "Free". Each time the Queue Control logic 7 wishes to add a descriptor 11 to transmit queues 9 (EnQueue), it must check that the state 19 of all ports/queues 9 for that descriptor are "Free". If all the markers 21 representing the ports/queues 9 are not "Free" the Duplicate Buffer Error (type EnQueue) is set. If all port/queue states 19 were "Free", the Queue Control logic 7 will set to "Active" the state 19 of each port/queue that accepted a copy of the buffer descriptor 11. FIG. 3 shows the Descriptor Reference Memory structure required to implement Per Port/Queue State based Duplicate Buffer Detection.

Each time the Queue Control logic 7 detects that a packet has been sent from a particular queue 9, the descriptor 11 (descriptor set) is removed from that transmit queue 9. The Queue Control logic 7 checks that the port/queue specific state 19 in the marker 21 of that descriptor is "Active". If the port/queue descriptor state 19 is not "Active", the Duplicate Buffer Error (type DeQueue) is set. If the port/queue descriptor state 19 was "Active" the Queue Control logic 7 sets it to "Free". If the all port/queue states 19 in all the markers 21 for the descriptor are "Free", the descriptor 11 is returned to the Descriptor Free Pool 3.

The Per Port/Queue method stores the individual state 19 in separate markers 21 for each port/queue 9 in each Reference Memory location 15. This is less efficient in terms of memory and compare logic width. The advantage of this method is twofold. Errors are isolated to a port/queue 9, and errors are detected immediately. Individual port/queues 9 may be reinitialized, allowing all other packet streams to continue. Immediate detection will minimize, and in robust designs prevent, the transmission of bad packets.

While specific embodiments of the invention have been shown and described in detail to illustrate the application of the principles of the invention, it will be understood that the invention may be embodied otherwise without departing from such principles.

What is claimed is:

1. A method for detecting duplicate buffers in a descriptor based queue, the method comprising the steps of:

providing a main data memory with a plurality of buffers for storing data packets;

providing a plurality of descriptors, each of said plurality of descriptors pointing to one of said buffers;

providing a plurality of transmit queues for transmitting data packets;

providing a descriptor reference memory storing status information of said plurality of descriptors, said status information including active and free states of respective said descriptors and an indication of copies of said descriptors in said transmit queues;

providing a descriptor free pool including a list of said descriptors having said status information of said free state;

receiving a data packet;

removing one of said descriptors from said descriptor free pool;

checking said status information in said descriptor reference memory for said one descriptor after said removing;

indicating a duplicate buffer error if said checking reveals said status information is said active state;

storing said data packet in said buffer of said main memory as pointed to by said one descriptor;

placing a copy of said one descriptor in one or more of said plurality of transmit queues;

changing said status information in said descriptor reference memory from said free state to said active state, and recording an indication of said copies of said one descriptor placed in said plurality of transmit queues;

transmitting data packets from said main data memory corresponding to said copies of said descriptors in said transmit queues, and removing corresponding said copies of said descriptors from corresponding said transmit queues after said transmitting;

checking said status information in said descriptor reference memory for said one descriptor after said transmitting:

indicating a duplicate buffer error if said checking after said transmitting reveals said status information is said free state;

decrementing said indication of copies of said one descriptor each time said copy of said one descriptor is removed from said plurality of transmit queues;

returning said one descriptor to said descriptor free pool when said indication of copies is empty and changing said status information from said active state to said free state.

2. The method in accordance with claim 1, wherein:

said indication of copies is stored as a count in said descriptor reference memory.

3. The method in accordance with claim 1, wherein:

said indication of copies is stored using individual markers for each said copy.

4. The method in accordance with claim 1, wherein:

said indication of copies is stored using individual markers for each said transmit queue.

5. The method in accordance with claim 1, wherein:

said descriptors point to a starting address of a fixed length block of memory, said fixed length block being larger than or equal to a maximum length of a data packet.

6. The method in accordance with claim 1, wherein:

said descriptors point to a starting address of a fixed length block of memory;

said removing of said descriptor from said descriptor free pool, includes removing a set of said descriptors from said descriptor free pool when said main data memory receives a data packet larger than said fixed length block of memory;

said storing of said data packet is in said buffers of said main memory as pointed to by said set of descriptors, said set of descriptors being treated as a unit for a duration of said data packet in said main data memory.

7. The method in accordance with claim 1, wherein:

said transmit queues are associated with a specific destination port of a multi-port descriptor queue memory system.

8. A multi-port descriptor queue memory system for detecting duplicate buffers in a descriptor based queue, the method comprising the steps of:

a main data memory with a plurality of buffers for storing data packets;

a plurality of descriptors, each of said plurality of descriptors pointing to one of said buffers;

a plurality of transmit queues for queuing data packets for transmission;

a descriptor reference memory storing status information of said plurality of descriptors, said status information including active and free states of respective said descriptors and an indication of copies of said descriptors in said transmit queues;

a descriptor free pool including a list of said descriptors having said status information of said free state;

queuing control logic removing one of said descriptors from said descriptor free pool when said main data memory receives a data packet, said queuing control logic checking said status information in said descriptor reference memory for said one descriptor after said removing and indicating a duplicate buffer error if said checking reveals said status information is said active state, said queuing control logic storing said data packet in said buffer of said main memory as pointed to by said one descriptor, said queuing control logic placing a copy of said one descriptor in one or more of said plurality of transmit queues and changing said status information in said descriptor reference memory from said free state to said active state, said queuing control logic also recording an indication of said copies of said one descriptor placed in said plurality of transmit queues, said queuing control logic transmitting data packets from said main data memory corresponding to said copies of said descriptors in said transmit queues and removing corresponding said copies of said descriptors from corresponding said transmit queues after said transmitting, said queuing control logic checking said status information in said descriptor reference memory for said one descriptor after said transmitting, said queuing control logic indicating a duplicate buffer error if said checking after said transmitting reveals said status information is said free state, said queuing control logic decrementing said indication of copies of said one descriptor each time said copy of said one descriptor is removed from said plurality of transmit queues and said queuing control logic returning said one descriptor to said descriptor free pool when said indication of copies is empty and changing said status information from said active state to said free state.

9. The system in accordance with claim 8, wherein:

said indication of copies is stored as a count in said descriptor reference memory.

10. The system in accordance with claim 8, wherein:

said indication of copies is stored using individual markers for each said copy.

11. The system in accordance with claim 8, wherein:

said indication of copies is stored using individual markers for each said transmit queue.

12. The system in accordance with claim 8, wherein:

said descriptors point to a starting address of a fixed length block of memory, said fixed length block being larger than or equal to a maximum length of a data packet.

13. The system in accordance with claim 8, wherein:

said descriptors point to a starting address of a fixed length block of memory, said queuing control logic removes a set of said descriptors from said descriptor free pool when said main data memory receives a data packet larger than said fixed length block of memory and said queuing control logic storing said data packet in said buffers of said main memory as pointed to by said set of descriptors, said set of descriptors being treated as a unit for a duration of said data packet in said main data memory.

14. The system in accordance with claim 8, wherein:

said transmit queues are associated with a specific destination port of the multi-port descriptor queue memory system.

* * * * *